United States Patent [19]

Rydstad et al.

[11] Patent Number: 4,722,469

[45] Date of Patent: Feb. 2, 1988

[54] PROCESS FOR CONNECTING COMPONENTS MADE OF A DISPERSION-HARDENED SUPERALLOY USING THE PRESSURE-BONDING METHOD

[75] Inventors: Hans Rydstad, Birmenstorf; Robert Singer, Untersiggenthal, both of Switzerland

[73] Assignee: BBC Brown, Boveri & Company, Limited, Baden, Switzerland

[21] Appl. No.: 868,058

[22] Filed: May 29, 1986

[30] Foreign Application Priority Data

Jun. 11, 1985 [CH] Switzerland ............... 2456/85

[51] Int. Cl.$^4$ ............................................. B23K 20/00
[52] U.S. Cl. .................................. 228/193; 228/203; 228/238; 228/263.13; 228/231
[58] Field of Search ............. 228/263.13, 231, 232, 228/193, 203, 205, 238

[56] References Cited

U.S. PATENT DOCUMENTS 4,531,981 7/1985 Singer ........................ 148/11.5 P

OTHER PUBLICATIONS

*Metals Handbook*, vol. 2, "Heat Treating of Nickel and Nickel Alloys", 1964, p. 297.
Gerken et al., "A Review of Diffusion Welding," *Welding Research Council Bulletin*, 10/65.

Primary Examiner—Nicholas P. Godici
Assistant Examiner—Karen Skillman
Attorney, Agent, or Firm—Oblon, Fisher, Spivak, McClelland & Maier

[57] ABSTRACT

Components made of a dispersion-hardened superalloy are connected together by pressure bonding, the individual parts previously processed at their bonding surfaces only by milling, without fine machining such as grinding, electro-polishing, etc., being subjected before bonding to a heat treatment in the temperature range of between 60° C. and 210° C. below the recrystallization temperature for the purpose of reducing the driving force. During the subsequent coarse-grain heat treatment of the bonded workpiece, no sort of fine crystalline banding occurs in the bonding zone and the strength of the workpiece corresponds to that of the material before bonding.

2 Claims, 1 Drawing Figure

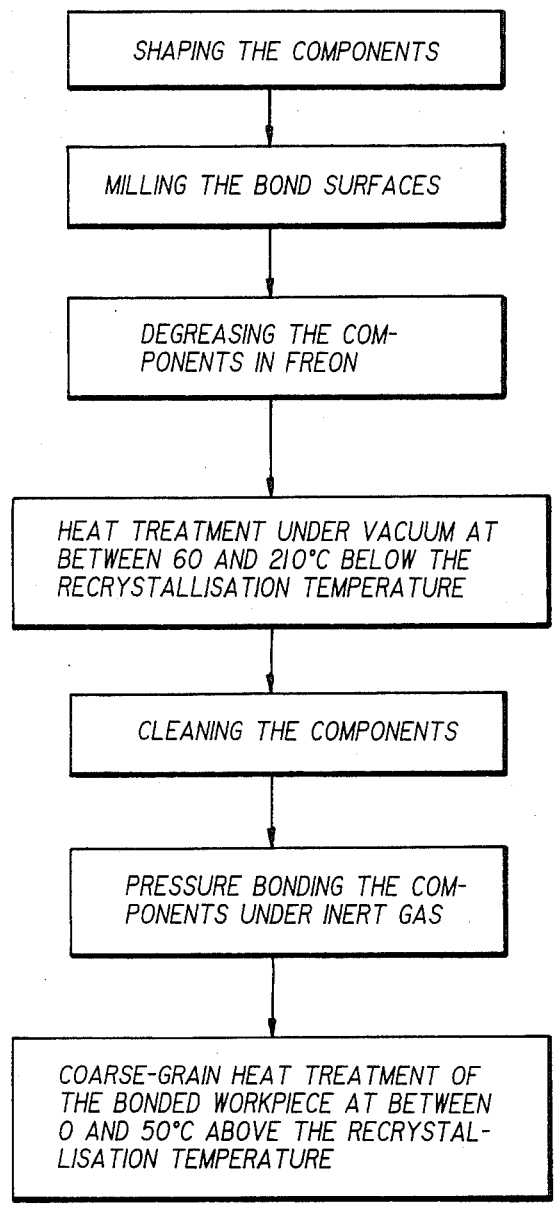

PROCESS FOR CONNECTING COMPONENTS MADE OF A DISPERSION-HARDENED SUPERALLOY USING THE PRESSURE-BONDING METHOD

The invention is based on a process for connecting components made of a dispersion-hardened superalloy in accordance with the generic type of the preamble to claim 1.

Complicated workpieces, particularly those having concave and hollow shapes, made of oxide dispersion-hardened superalloys (gas turbine blades), often have to be manufactured from individual parts and the latter are then connected together to make a complete unit by an appropriate jointing process. Such processes for connecting components are known (see, for example, G. H. Gessinger, Powder Metallurgy of Superalloys, Butterworths 1984, Section 8.2.1 Diffusion Bonding, pages 306 to 312). Extremely high requirements for accuracy and surface quality are generally set for the surfaces to be connected, and these can only be achieved by the finest grinding, electro-polishing, etc.—see M. M. Schwartz, Metal Joining Manual, 1979 N.Y., Chapter 10 Diffusion Welding, in particular the section "Surface Preparation", Pages 10-7 to 10-9. This also applies to processes in which the components are joined in the non-recrystallised condition, the recrystallisation front passing through the jointing zone due to a subsequent coarse-grain heat treatment (for example, U.S. Pat. No. 3,798,748).

It is clear from the above that the conventional joining methods, such as diffusion bonding, pressure welding, etc., are associated with a very complicated and expensive surface preparation for the surfaces to be joined. There is, therefore, a large requirement for effective cost reduction and simplification in this area.

The object of the invention is to provide a process for connecting components made of an oxide dispersion-hardened superalloy using the pressure-bonding method, which method avoids the complicated preparation of the components, in particular the lengthy extremely fine machining and treatment of the surfaces to be joined, and which leads to reproducible, low cost results which can be applied economically in mass production.

This object is attained by the features given in the characterising part of claim 1.

The invention is described by means of the following embodiment example explained in more detail by means of a FIGURE.

The FIGURE shows a flow diagram of the process in a block presentation. The FIGURE does not require any further explanation.

EMBODIMENT EXAMPLE

Two similar cylindrical test bodies have been connected together at their end surfaces using the pressure-bonding process.

The test bodies had the following dimensions:
Diameter = 15 mm
Height = 24 mm

An oxide dispersion-hardened nickel base superalloy with the commercial designation MA 6000 (INCO) in the fine grain, non-recrystallised condition was used as the material. The alloy had the following composition:
Ni ≈ 69% by weight
Cr = 15% by weight
W = 4.0% by weight
Mo = 2.0% by weight
Al = 4.5% by weight
Ti = 2.5% by weight
Ta = 2.0% by weight
C = 0.05% by weight
B = 0.01% by weight
Zr = 0.15% by weight
$Y_2O_3$ = 1.1% by weight The actual recrystallization temperature of MA 6000 is reported according to different authors to be between 1165° and 1200° C. See Russel K. Motzler, Thomas K. Glasgow, "Recrystallization Characteristics of Oxide Dispersion Strengthed Nickel-Based Alloys", Superalloys 1980, American Society for Metals. The joint surfaces of the components are pressed together and bonded at a temperature which is below the recrystallization temperature of the material.

The end surfaces of the test bodies to be joined were simply machined clean using hard metal milling cutters to a coarse finish. Fine grinding or electro-polishing is not necessary! After machining, the test bodies were degreased in Freon. They were then heat-treated in a vacuum furnace for 10 minutes at a temperature of 1050° C.

This heat treatment removes the excess driving force previously generated in the surface zone by the machining and which would lead to a fine-grain recrystallising bonding zone during the subsequent bonding and heat treatment. After the heat treatment at 1050° C., the test pieces were cleaned and brought to a bonding temperature of 980° C. under an inert gas atmosphere. The bonding took place under pressure in a heated tool, consisting of a die upper part and a die lower part, in a press. After bonding, the workpiece was subjected to a heat treatment serving to form coarse grain (recrystallisation) for 1 hour at a temperature of 1200° C. and finally cooled in air. Testing indicated no reduction in the strength values compared with the unbonded material. Metallographic examination of the workpiece showed no fine grain formation in the bonding zone. No joint position could be recognised using an optical microscope.

The process is not limited to the embodiment example. Components in materials other than MA 6000 can also be bonded in an economic manner using this process. The heat treatment with the objective of reducing the driving force before bonding is carried out in a temperature range of between 60° C. and 210° C. below the recrystallisation temperature of the material. The heat treatment periods are generally between 4 and 80 minutes, their duration being longer for lower heat treatment temperatures.

We claim:

1. A process for connecting components made of a dispersion-hardened superalloy by the pressure-bonding method, which comprises:
   cleaning the surfaces of the alloy components to be joined;
   machining the cleaned surfaces by a conventional coarse milling, turning or grinding operation which operation excludes fine machining of the joint surfaces;
   preliminarily heat treating the alloy components in the temperature range between 60° C. and 210° C. below the recrystallization temperature for the purpose of removing the excess driving force generated during said machining operation;

pressing said surfaces to be joined under an inert gas atmosphere at a temperature below the recrystallization temperature to bond the alloy components; and then subjecting said bonded components to a coarse-grain heat treatment above the recrystallization temperature of the alloy.

2. The method of claim 1, wherein said superalloy components have the composition:

Ni ≈ 69%
Cr = 15%
W = 4.0%
Mo = 2.0%
Al = 4.5%
Ti = 2.5%
Ta = 2.0%
C = 0.05%
B = 0.01%
Zr = 0.15%
$Y_2O_3$ = 1.1% (all percentages by weight).

* * * * *